(12) United States Patent
Alcantara

(10) Patent No.: US 12,264,711 B2
(45) Date of Patent: Apr. 1, 2025

(54) DRIVE SHAFT CONNECTION

(71) Applicant: GM GLOBAL TECHNOLOGY OPERATIONS LLC, Detroit, MI (US)

(72) Inventor: Avissai Alcantara, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 18/101,410

(22) Filed: Jan. 25, 2023

(65) Prior Publication Data
US 2024/0247669 A1   Jul. 25, 2024

(51) Int. Cl.
| F16D 1/116 | (2006.01) |
| F16B 7/04 | (2006.01) |
| F16B 21/18 | (2006.01) |
| F16D 1/10 | (2006.01) |

(52) U.S. Cl.
CPC ............ *F16D 1/116* (2013.01); *F16B 7/0426* (2013.01); *F16B 21/183* (2013.01); *F16D 2001/103* (2013.01); *Y10T 403/7033* (2015.01)

(58) Field of Classification Search
CPC ...... F16B 7/0426; F16B 21/18; F16B 21/183; F16B 21/186; F16D 1/116; F16D 2001/103; F16D 2003/22323; Y10T 403/7033; Y10T 403/7035
USPC .......................................... 403/359.5, 359.6
See application file for complete search history.

(56) References Cited

U.S. PATENT DOCUMENTS

| 3,367,692 | A | * | 2/1968 | Balian | F16D 1/116 403/355 |
| 3,588,154 | A | * | 6/1971 | Voight | F16D 1/04 403/359.5 |
| 7,946,374 | B2 | * | 5/2011 | Kofuji | F16D 1/116 403/359.5 |
| 8,425,141 | B2 | * | 4/2013 | Disser | F16D 1/116 403/359.5 |
| 8,425,142 | B2 | * | 4/2013 | Disser | F16D 1/116 403/359.5 |
| 9,273,812 | B2 | * | 3/2016 | Bassaco | F16L 37/0885 |
| 10,151,352 | B2 | * | 12/2018 | Creek | F16D 1/116 |
| 11,441,610 | B2 | * | 9/2022 | Feichter | F16B 21/18 |

(Continued)

FOREIGN PATENT DOCUMENTS

| DE | 102014109472 A1 | * | 1/2016 | ............ F16B 21/186 |
| DE | 102014109473 A1 | * | 1/2016 | ............ F16B 21/186 |
| DE | 102018125349 A1 | * | 4/2020 | ............ F16B 21/18 |

*Primary Examiner* — Josh Skroupa

(57) ABSTRACT

A torque transfer assembly including a drive shaft with external splines. A first proximal groove and a first distal groove of the drive shaft are spaced apart at a first distance. A driven member includes a hub configured to receive the drive shaft. The hub includes internal splines, a second proximal groove, a second distal groove, and a slit. The second proximal groove and the second distal groove are spaced apart at a second distance equal to the first distance. A first retention member is configured to be inserted into the slit and into cooperation with the first proximal groove when the drive shaft is seated in the hub. The first distal groove of the drive shaft aligns with the second proximal groove of the hub when the drive shaft is within the hub such that the first proximal groove of the drive shaft is aligned with the slit.

20 Claims, 7 Drawing Sheets

(56) References Cited

U.S. PATENT DOCUMENTS

| | | | | |
|---|---|---|---|---|
| 11,668,351 | B2* | 6/2023 | Burgess | F16B 21/186 |
| | | | | 74/609 |
| 11,698,156 | B2* | 7/2023 | Kuhn | G06K 19/07758 |
| | | | | 285/84 |
| 12,000,439 | B2* | 6/2024 | Everly | F16D 1/116 |
| 12,092,250 | B2* | 9/2024 | Powell | F16L 37/144 |
| 2018/0023629 | A1* | 1/2018 | Sugiyama | F16D 1/116 |
| | | | | 464/143 |
| 2021/0222737 | A1* | 7/2021 | Sugiyama | F16D 1/116 |

* cited by examiner

DRIVE SHAFT CONNECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a drive shaft connection.

Torque transfer assemblies include a drive shaft connection with a drive shaft connected to a driven member. The driven member may include a hub configured to receive the drive shaft therein. The drive shaft rotates the driven member to transfer torque to the driven member.

SUMMARY

The present disclosure provides for, in various features, a torque transfer assembly. The assembly includes a drive shaft of a drive unit. The drive shaft includes external splines, a first proximal groove extending around the drive shaft, and a first distal groove extending around the drive shaft. The first proximal groove and the first distal groove are spaced apart at a first distance. A driven member includes a hub configured to receive the drive shaft therein. The hub includes internal splines configured to mesh with the external splines, a second proximal groove, a second distal groove, and a slit extending through the hub. The second proximal groove and the second distal groove are spaced apart at a second distance that is equal to the first distance. A first retention member is configured to be inserted into the slit and into cooperation with the first proximal groove of the drive shaft when the drive shaft is seated in the hub. A second retention member is configured to be seated between the drive shaft and the hub in the first distal groove of the drive shaft and the second proximal groove of the hub when the drive shaft is seated in the hub. The first distal groove of the drive shaft aligns with the second proximal groove of the hub when the drive shaft is positioned within the hub such that the first proximal groove of the drive shaft is aligned with the slit of the hub.

In various additional features, the first retention member includes a handle. In various additional features, the first retention member is a clip.

In various additional features, the second retention member is an elastomeric member extending less than 360°.

In various additional features, the slit and the second proximal groove of the hub are spaced apart at the second distance.

In various additional features, the slit is opposite to, and adjacent to, the second distal groove.

In various additional features, the first retention member is configured to be inserted through the slit into simultaneous cooperation with the first proximal groove of the drive shaft and the second distal groove of the hub when the drive shaft is seated in the hub.

In various additional features, the first proximal groove and the first distal groove of the drive shaft are at an exterior of the drive shaft, and the second proximal groove and the second distal groove of the hub are at an interior of the hub.

In various additional features, the first distal groove of the drive shaft is deeper than the first proximal groove of the drive shaft.

The present disclosure includes, in various features, a torque transfer assembly. The assembly includes a drive shaft of a drive unit. The drive shaft includes external splines, a first proximal groove extending around the drive shaft, and a first distal groove extending around the drive shaft. The first proximal groove and the first distal groove are spaced apart at a first distance. A driven member including a hub is configured to receive the drive shaft therein. The hub includes internal splines configured to mesh with the external splines, a second proximal groove, a second distal groove, and a slit extending through the hub adjacent to the second distal groove. The second proximal groove and the second distal groove are spaced apart at a second distance that is equal to the first distance. A retention clip is configured to be inserted into the slit and into cooperation with the first proximal groove when the drive shaft is seated in the hub. A retention member is configured to be seated between the drive shaft and the hub in the first distal groove of the drive shaft and the second proximal groove of the hub when the drive shaft is seated in the hub. The first distal groove of the drive shaft aligns with the second proximal groove of the hub when the drive shaft is positioned within the hub such that the first proximal groove of the drive shaft is aligned with the slit of the hub.

In various additional features, the retention clip includes a handle.

In various additional features, the retention clip includes a first arm extending from the handle, a second arm extending from the handle, and a gap defined between a first end of the first arm and a second end of the second arm.

In various additional features, the retention clip further includes a first tab at the first end and a second tab at the second end.

In various additional features, the retention clip is configured to be inserted through the slit into cooperation with both the first proximal groove of the drive shaft and the second distal groove of the hub when the drive shaft is seated within the hub.

In various additional features, the first proximal groove and the first distal groove of the drive shaft are at an exterior of the drive shaft; and the second proximal groove and the second distal groove of the hub are at an interior of the hub.

In various additional features, the retention member is elastomeric and extends less than 360°.

The present disclosure further includes, in various features, a torque transfer assembly including a drive shaft of a drive unit. The drive shaft includes external splines, a first proximal groove extending around the drive shaft, and a first distal groove extending around the drive shaft. The first proximal groove and the first distal groove are spaced apart at a first distance. A driven member includes a hub configured to receive the drive shaft therein. The hub includes internal splines configured to mesh with the external splines, a second proximal groove, a second distal groove, and a slit extending through the hub adjacent to the second distal groove. The second proximal groove and the slit are spaced apart at a second distance that is equal to the first distance. A retention clip is configured to be inserted into the slit into cooperation with the first proximal groove and the second distal groove when the drive shaft is seated in the hub. The retention clip includes a handle, a first arm extending from the handle, a second arm extending from the handle, and a gap defined between a first end of the first arm and a second end of the second arm. A retention member configured to be seated between the drive shaft and the hub in the first distal groove of the drive shaft and the second proximal groove of the hub when the drive shaft is seated in the hub. The first distal groove of the drive shaft aligns with the second proximal groove of the hub when the drive shaft is positioned within the hub such that the first proximal groove of the drive shaft is aligned with the slit of the hub.

In various additional features, the drive unit and the driven member are components of a vehicle transmission.

In various additional features, the drive unit and the driven member are components of an electric vehicle drive system.

In various additional features, the drive unit and the driven member are components of a power take-off system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
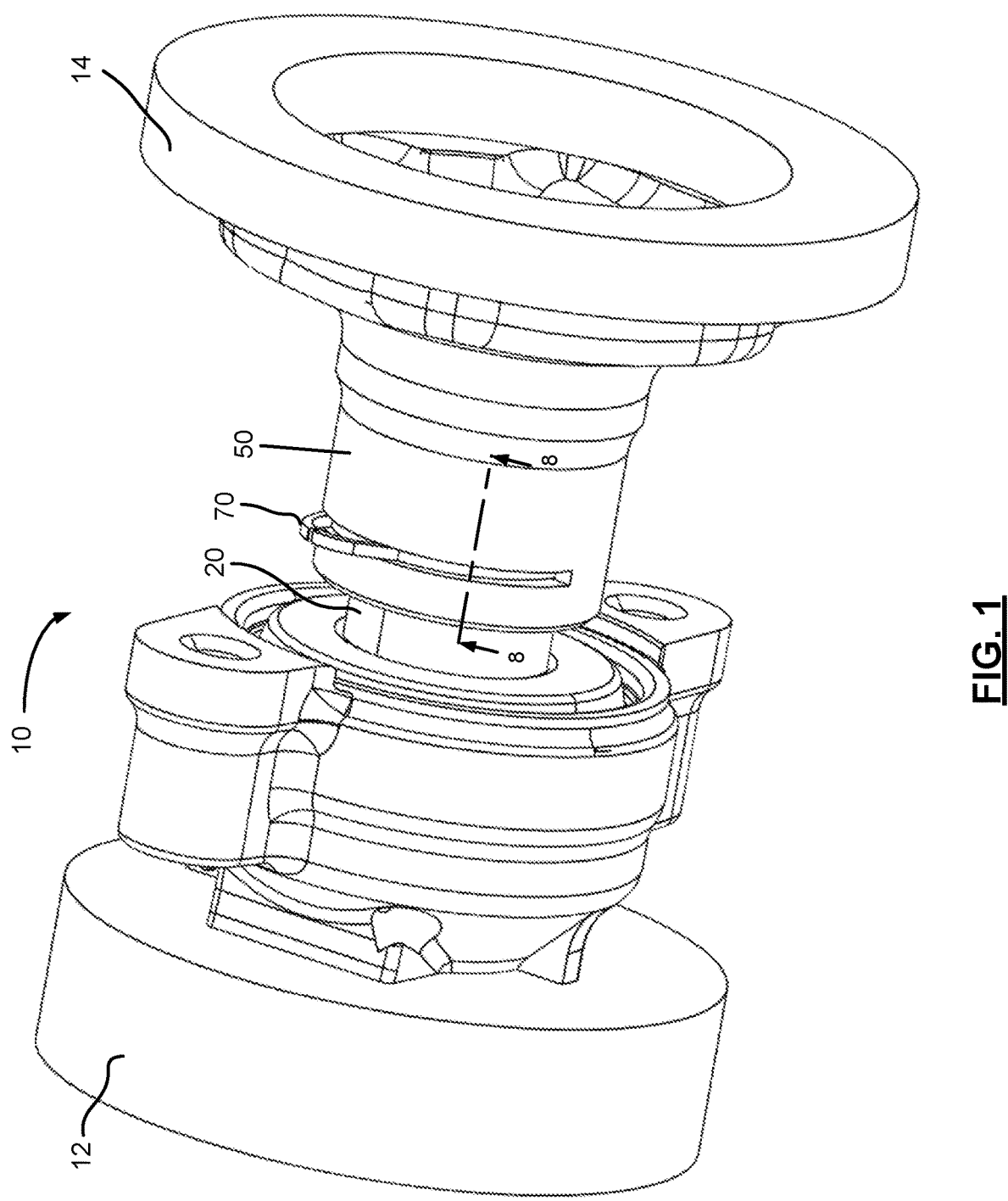
FIG. 1 is a perspective view of a torque transfer assembly in accordance with the present disclosure.

FIG. 1 illustrates an exemplary torque transfer assembly 10 in accordance with the present disclosure. The torque transfer assembly 10 generally includes a drive unit 12 and a driven member 14. The drive unit 12 is in cooperation with the driven member 14 to transfer torque from the drive unit 12 to the driven member 14. The torque transfer assembly 10 may be included in any suitable automotive or non-automotive application. Suitable automotive applications include, but are not limited to, a drive shaft connection, a half shaft connection, an electric motor drive unit, a power take-off unit, etc. In general, the torque transfer assembly 10 may be used in any suitable torque transfer application including a male-female connection.

Figure 2:
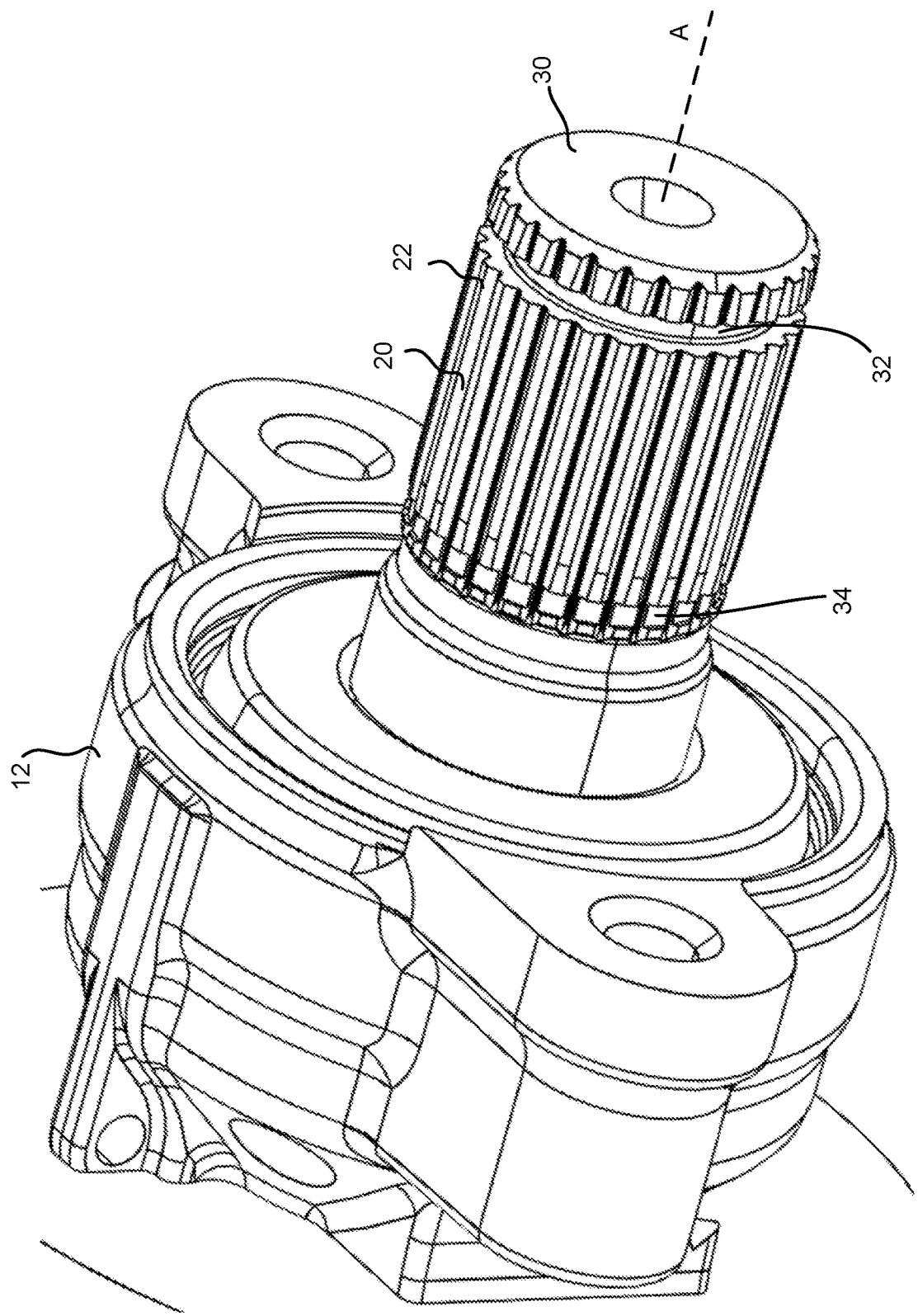
FIG. 2 is a perspective view of a drive unit of the torque transfer assembly of FIG. 1.
Figure 3:
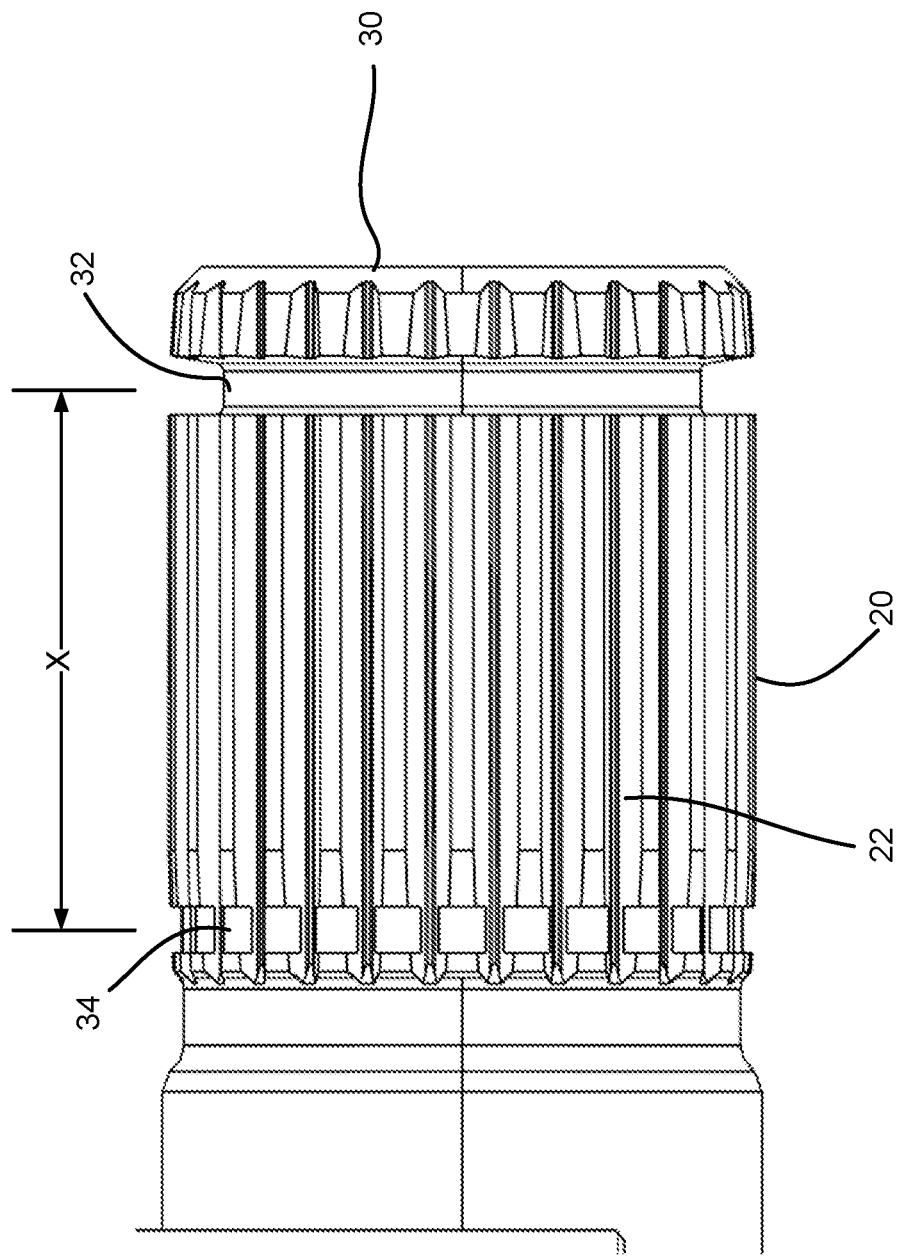
FIG. 3 is a side view of a drive shaft of the drive unit of FIG. 2.

With reference to FIGS. 2 and 3, the drive unit 12 includes a drive shaft 20. The drive unit 12 is configured to rotate the drive shaft 20 about a longitudinal axis A, which extends along an axial center of the drive shaft 20. The drive shaft 20 includes a plurality of external splines 22 spaced apart about an outer surface of the drive shaft 20. The external splines 22 extend parallel to the longitudinal axis A.

The drive shaft 20 extends from the drive unit 12 to a distal end 30 of the drive shaft 20. Proximate to, and spaced apart from, the distal end 30 is a first distal groove 32 of the drive shaft 20. The first distal groove 32 extends around the exterior of the drive shaft 20, and is devoid the external splines 22. The drive shaft 20 further includes a first proximal groove 34. The first proximal groove 34 is inboard of the first distal groove 32. The first proximal groove 34 extends around the drive shaft. In the example illustrated, the first distal groove 32 is deeper than the first proximal groove 34. The first proximal groove 34 may be formed in any suitable manner. For example, the first proximal groove 34 may include a plurality of flattened portions of the external splines 22, as illustrated in FIGS. 2 and 3. With particular reference to FIG. 3, the first distal groove 32 and the first proximal groove 34 are spaced apart at a first distance X.

Figure 4:
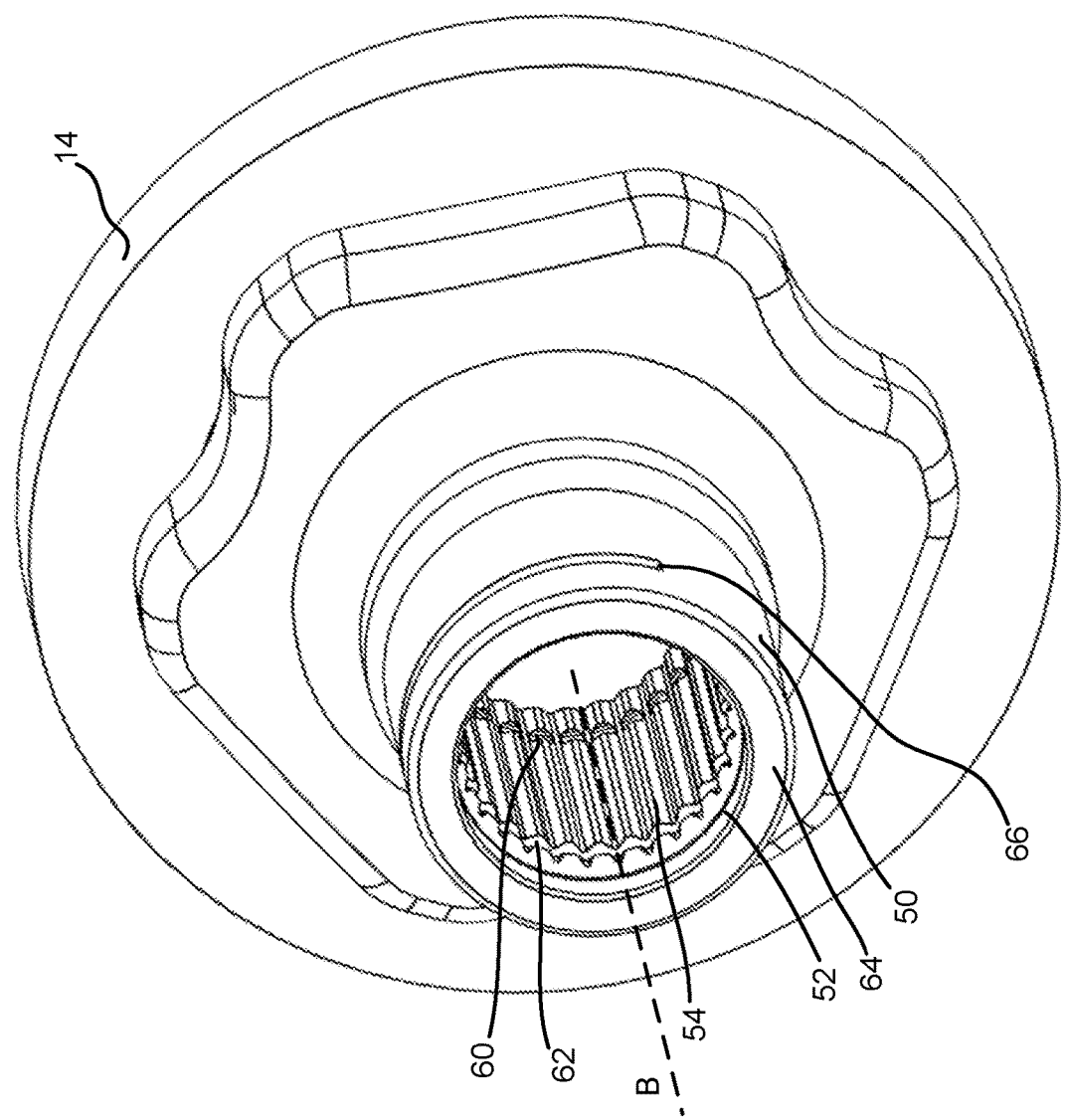
FIG. 4 is a perspective view of a driven member of the torque transfer assembly of FIG. 1.
Figure 5:
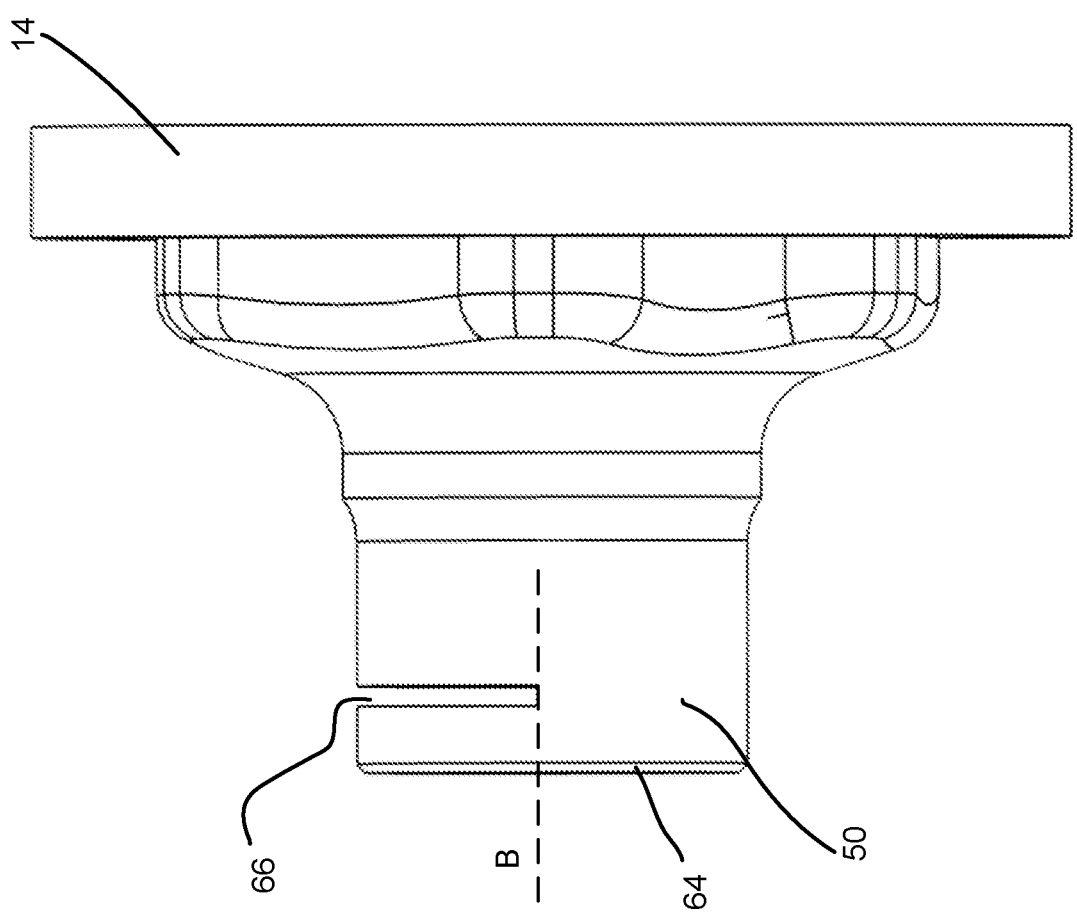
FIG. 5 is a side view of the driven member of FIG. 4.

With reference to FIGS. 4 and 5, the driven member 14 includes a hub 50. The hub 50 defines a receptacle 52, which is configured to receive the drive shaft 20 therein. Within the receptacle 52 are a plurality of internal splines 54. The internal splines 54 are sized, shaped, arranged, and otherwise configured to mesh with the external splines 22 of the drive shaft 20.

The hub 50 further includes a second proximal groove 60 and a second distal groove 62 within the receptacle 52. The second distal groove 62 is between a distal end 64 of the hub 50 and the second proximal groove 60. The second proximal groove 60 and the second distal groove 62 are spaced apart at a second distance that is equal to the first distance X at which the first distal groove 32 and the first proximal groove 34 of the drive shaft 20 are spaced apart. The second proximal groove 60 extends around an interior of the hub 50, and may be formed in any suitable manner. In the example illustrated, the second proximal groove 60 is defined by flattened portions of the internal splines 54.

The hub 50 further includes a slit 66. The slit 66 extends through the hub 50 to define a passageway into the receptacle 52. The slit 66 is aligned with the second distal groove 62 along a longitudinal axis B of the hub 50. Thus, the slit 66 is opposite to the second distal groove 62, which extends around less than an entirety of the interior of the hub 50. The slit 66 and the second proximal groove 60 are spaced apart at the second distance, which is equal to the first distance X at which the first distal groove 32 and the first proximal groove 34 of the drive shaft 20 are spaced apart.

Figure 6:
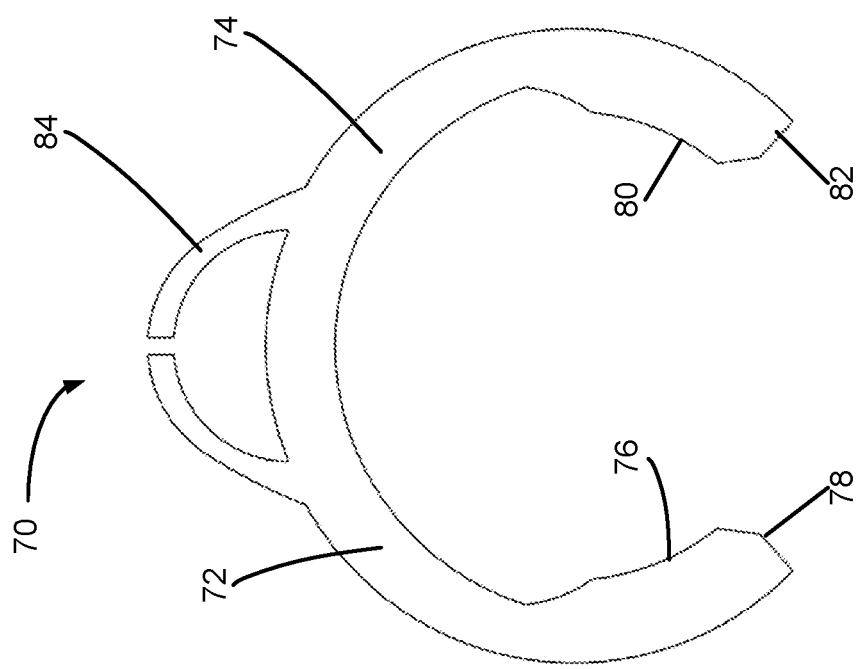
FIG. 6 illustrates a first retention member of the torque transfer assembly of FIG. 1.
Figure 7:
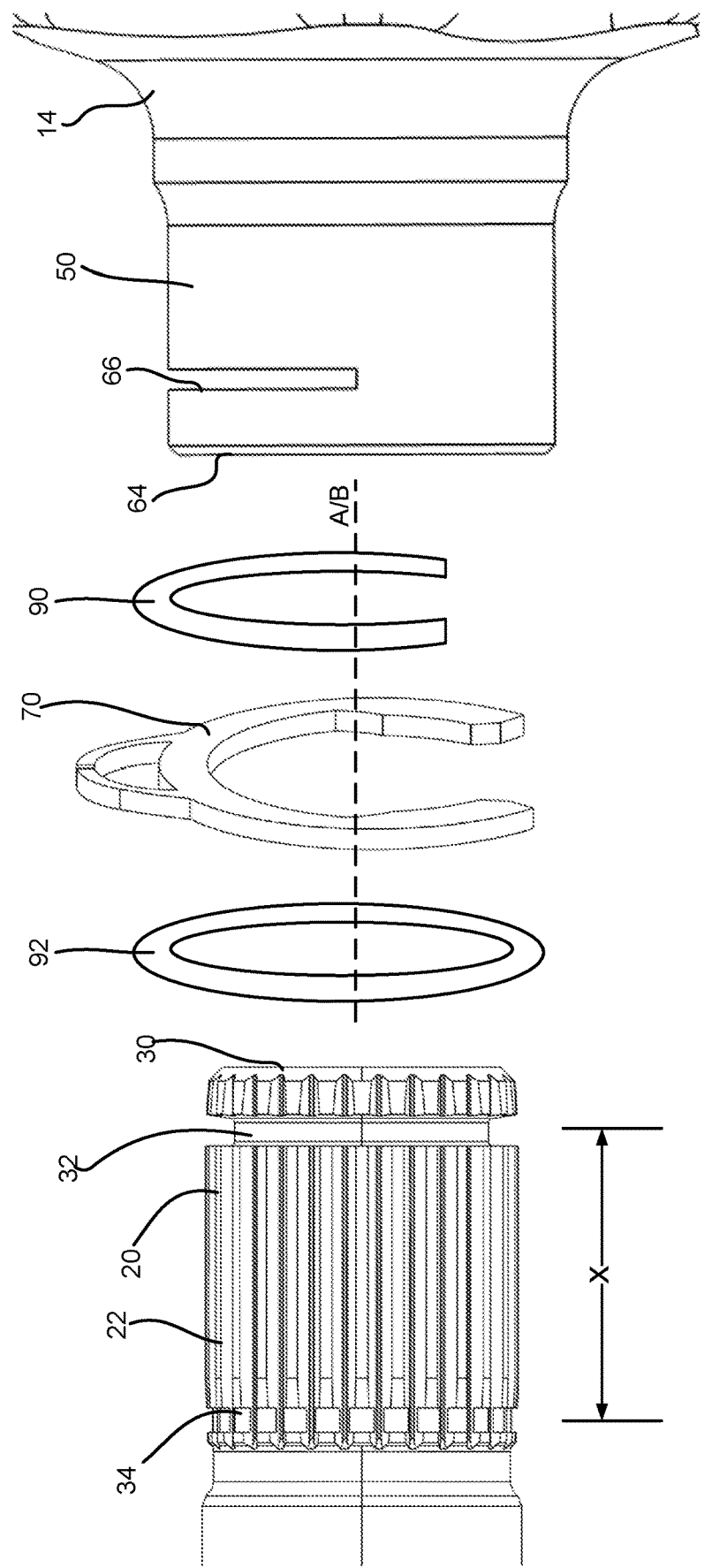
FIG. 7 is an exploded view of the torque transfer assembly of FIG. 1.

With reference to FIGS. 6 and 7, the torque transfer assembly 10 further includes a first retention member 70. The first retention member 70 may be configured as a clip, as illustrated. The first retention member 70 generally includes a first arm 72 and a second arm 74. The first arm 72 includes a first tab 76 at a first end 78. The second arm 74 includes a second tab 80 at a second end 82. A gap is defined between the first end 78 and the second end 82. The first tab 76 and the second tab 80 are generally wider portions of the first arm 72 and the second arm 74 respectively. Between the first arm 72 and the second arm 74 is a handle 84. The handle 84 facilitates insertion and removal of the first retention member 70 into, and out of, the slit 66, as explained herein. The first retention member 70 is sized and shaped to be inserted into the slit 66 and seated in the first proximal groove 34 of the drive shaft 20, and within the second distal groove 62 of the hub 50, as illustrated in FIG. 8.

With reference to FIG. 7, the torque transfer assembly 10 further includes a second retention member 90. In the example illustrated, the second retention member 90 is configured as a ring that extends less than 360°. The second retention member 90 may be made of any suitable material, such as any suitable elastomeric material. The second retention member 90 is sized and shaped to be seated between the drive shaft 20 and the hub 50 within the first distal groove 32 and the second proximal groove 60.

Figure 8:
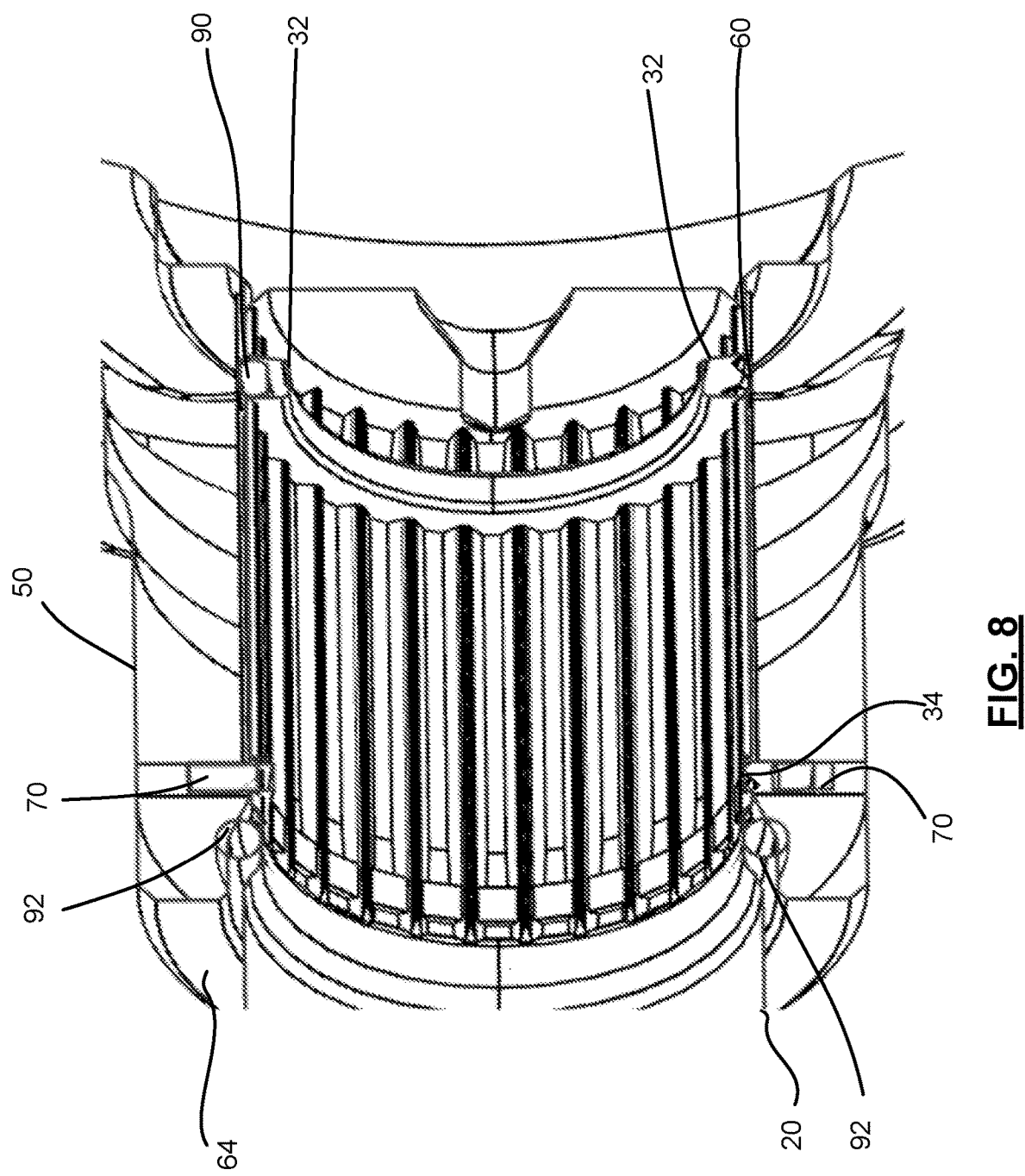
FIG. 8 is a cross-sectional view of an interface between the drive shaft and a hub of the driven member taken along line 8-8 of FIG. 1.

With particular reference to FIG. 8, the connection between the drive shaft 20 and the hub 50, and manner of making the connection, will now be described in further detail. Prior to insertion of the drive shaft 20 into the hub 50, the second retention member 90 is seated in the first distal groove 32 of the drive shaft 20. The drive shaft 20 is then inserted into the hub 50 such that the external splines 22 of the drive shaft 20 mesh with the internal splines 54 of the hub 50. The drive shaft 20 is advanced into the hub 50 until the first proximal groove 34 of the drive shaft 20 is visible through the slit 66.

When the first proximal groove 34 is visible through the slit 66, the first distal groove 32 of the drive shaft 20 will be aligned with the second proximal groove 60 of the hub 50 because the first distance X between the first proximal groove 34 and the first distal groove 32 is the same as a second distance between the second distal groove 62 and the second proximal groove 60. Thus, visual aligning the first proximal groove 34 with the slit 66 ensures that the second retention member 90 is aligned with the second proximal groove 60.

As the second retention member 90 is inserted into the receptacle 52 of the hub 50, the second retention member 90 gets compressed until it reaches the second proximal groove 60. At the second proximal groove 60, the second retention member 90 expands back to its original shape so as to extend into the second proximal groove 60. Aligning the proximal groove 34 with the slit 66 ensures that the first distal groove 32 is aligned with the second proximal groove 60, which allows the second retention member 90 to expand into the second proximal groove 60 and lock the drive shaft 20 in the hub 50. Accordingly, an installer is able to accurately align the first distal groove 32 with the second proximal groove 60, which occurs deep within the hub 50 out of the installer's view, by visually aligning the first proximal groove 34 with the slit 66. With the first proximal groove 34 aligned with the slit 66, the first retention member 70 is inserted into the slit 66, and into cooperation with both the first proximal groove 34 of the drive shaft 20 and the second distal groove 62 of the hub 50. The first retention member 70 acts to retain the drive shaft 20 within the hub 50 along with the second retention member 90. A ring, such as an O-ring 92, may be seated between the drive shaft 20 and the hub 50 outboard of the first retention member 70, as illustrated in FIG. 8, for example. The O-ring 92 may be an elastomeric member configured to keep contaminants outside of the interface between the drive shaft 20 and the hub 50.

During servicing, the first retention member 70 may be easily removed by grasping the handle 84, and pulling the first retention member 70 out through the slit 66. The drive shaft 20 may then be removed from within the hub 50 for servicing. After service is complete, the drive shaft 20 may be reinserted into the hub 50 in the same manner as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A torque transfer assembly comprising:
 a drive shaft of a drive unit, the drive shaft including external splines, a first proximal groove extending around the drive shaft, and a first distal groove extending around the drive shaft, the first proximal groove and the first distal groove are spaced apart at a first distance;
 a driven member including a hub configured to receive the drive shaft therein, the hub including internal splines configured to mesh with the external splines, a second proximal groove, a second distal groove, and a slit extending through the hub, the second proximal groove and the second distal groove are spaced apart at a second distance that is equal to the first distance;
 a first retention member configured to be inserted into the slit and into cooperation with the first proximal groove of the drive shaft when the drive shaft is seated in the hub; and
 a second retention member configured to be seated between the drive shaft and the hub in the first distal groove of the drive shaft and the second proximal groove of the hub when the drive shaft is seated in the hub;
 wherein the first distal groove of the drive shaft aligns with the second proximal groove of the hub when the drive shaft is positioned within the hub such that the first proximal groove of the drive shaft is aligned with the slit of the hub.

2. The torque transfer assembly of claim 1, wherein the first retention member includes a handle.

3. The torque transfer assembly of claim 2, wherein the first retention member is a clip.

4. The torque transfer assembly of claim 1, wherein the second retention member is an elastomeric member extending less than 360°.

5. The torque transfer assembly of claim 1, wherein the slit and the second proximal groove of the hub are spaced apart at the second distance.

6. The torque transfer assembly of claim 1, wherein the slit is opposite to, and adjacent to, the second distal groove.

7. The torque transfer assembly of claim 1, wherein the first retention member is configured to be inserted through the slit into simultaneous cooperation with the first proximal groove of the drive shaft and the second distal groove of the hub when the drive shaft is seated in the hub.

8. The torque transfer assembly of claim 1, wherein:
the first proximal groove and the first distal groove of the drive shaft are at an exterior of the drive shaft; and
the second proximal groove and the second distal groove of the hub are at an interior of the hub.

9. The torque transfer assembly of claim 1, wherein the first distal groove of the drive shaft is deeper than the first proximal groove of the drive shaft.

10. A torque transfer assembly comprising:
a drive shaft of a drive unit, the drive shaft including external splines, a first proximal groove extending around the drive shaft, and a first distal groove extending around the drive shaft, the first proximal groove and the first distal groove are spaced apart at a first distance;
a driven member including a hub configured to receive the drive shaft therein, the hub including internal splines configured to mesh with the external splines, a second proximal groove, a second distal groove, and a slit extending through the hub adjacent to the second distal groove, the second proximal groove and the second distal groove are spaced apart at a second distance that is equal to the first distance;
a retention clip configured to be inserted into the slit and into cooperation with the first proximal groove when the drive shaft is seated in the hub; and
a retention member configured to be seated between the drive shaft and the hub in the first distal groove of the drive shaft and the second proximal groove of the hub when the drive shaft is seated in the hub;
wherein the first distal groove of the drive shaft aligns with the second proximal groove of the hub when the drive shaft is positioned within the hub such that the first proximal groove of the drive shaft is aligned with the slit of the hub.

11. The torque transfer assembly of claim 10, wherein the retention clip includes a handle.

12. The torque transfer assembly of claim 11, wherein the retention clip includes a first arm extending from the handle, a second arm extending from the handle, and a gap defined between a first end of the first arm and a second end of the second arm.

13. The torque transfer assembly of claim 12, wherein the retention clip further includes a first tab at the first end and a second tab at the second end.

14. The torque transfer assembly of claim 10, wherein the retention clip is configured to be inserted through the slit into cooperation with both the first proximal groove of the drive shaft and the second distal groove of the hub when the drive shaft is seated within the hub.

15. The torque transfer assembly of claim 10, wherein:
the first proximal groove and the first distal groove of the drive shaft are at an exterior of the drive shaft; and
the second proximal groove and the second distal groove of the hub are at an interior of the hub.

16. The torque transfer assembly of claim 10, wherein the retention member is elastomeric and extends less than 360°.

17. A torque transfer assembly comprising:
a drive shaft of a drive unit, the drive shaft including external splines, a first proximal groove extending around the drive shaft, and a first distal groove extending around the drive shaft, the first proximal groove and the first distal groove are spaced apart at a first distance;
a driven member including a hub configured to receive the drive shaft therein, the hub including internal splines configured to mesh with the external splines, a second proximal groove, a second distal groove, and a slit extending through the hub adjacent to the second distal groove, the second proximal groove and the slit are spaced apart at a second distance that is equal to the first distance;
a retention clip configured to be inserted into the slit into cooperation with the first proximal groove and the second distal groove when the drive shaft is seated in the hub, the retention clip including a handle, a first arm extending from the handle, a second arm extending from the handle, and a gap defined between a first end of the first arm and a second end of the second arm; and
a retention member configured to be seated between the drive shaft and the hub in the first distal groove of the drive shaft and the second proximal groove of the hub when the drive shaft is seated in the hub;
wherein the first distal groove of the drive shaft aligns with the second proximal groove of the hub when the drive shaft is positioned within the hub such that the first proximal groove of the drive shaft is aligned with the slit of the hub.

18. The torque transfer assembly of claim 17, wherein the drive unit and the driven member are components of a vehicle transmission.

19. The torque transfer assembly of claim 17, wherein the drive unit and the driven member are components of an electric vehicle drive system.

20. The torque transfer assembly of claim 17, wherein the drive unit and the driven member are components of a power take-off system.

\* \* \* \* \*